United States Patent
Devarapalli et al.

(10) Patent No.: US 10,558,990 B2
(45) Date of Patent: Feb. 11, 2020

(54) METHOD AND SYSTEM FOR DYNAMICALLY TRACING A VALUE REALIZED BY AN INFORMATION TECHNOLOGY (IT) SERVICE

(71) Applicant: Tata Consultancy Services Limited, Mumbai (IN)

(72) Inventors: Hari Prasad Devarapalli, Hyderabad (IN); Narayana Guru Prasada Lakshmi Mandaleeka, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 266 days.

(21) Appl. No.: 14/668,400

(22) Filed: Mar. 25, 2015

(65) Prior Publication Data

US 2016/0283957 A1  Sep. 29, 2016

(51) Int. Cl.
*G06Q 30/02* (2012.01)
*H04L 12/24* (2006.01)

(52) U.S. Cl.
CPC ..... *G06Q 30/0206* (2013.01); *H04L 41/5058* (2013.01)

(58) Field of Classification Search
CPC .................. G06Q 30/0206; H04L 41/5058
See application file for complete search history.

(56) References Cited

U.S. PATENT DOCUMENTS

| 7,937,304 | B2 | 5/2011 | Melnicoff et al. |
| 8,554,593 | B2 | 10/2013 | Kasravi et al. |
| 2005/0131754 | A1 | 6/2005 | Chapman et al. |

(Continued)

OTHER PUBLICATIONS

Chris Tiernan, Joe Peppard, "Information Technology: Of Value or a Vulture?" European Management Journal, vol. 22, No. 6, 2004, pp. 609-623 (25 pages).

(Continued)

*Primary Examiner* — Sujay Koneru
(74) *Attorney, Agent, or Firm* — Shumaker, Loop & Kendrick, LLP

(57) ABSTRACT

Disclosed is a method and system for dynamically tracing a value realized by an Information Technology (IT) service. The method may comprise generating a correlation matrix representing relationship between a plurality of dimensions associated with an IT service, wherein the correlation matrix is generated in form of a plurality of quadrants, wherein each quadrant represent the relationship between at least two dimensions. The method may further comprise capturing a hierarchy of parameters associated with the dimensions, wherein at least one parameter, in the hierarchy, is contextually related and dependent upon at least one other parameter. Further, the method may comprise computing a relative value realization index (rVRI) using the hierarchy of parameters, wherein the relative value realization index is indicative of value realized, by the IT service, with respect to the dimensions. Furthermore, the method may comprise generating a traceability matrix indicating correlation between the relative value realization index and the hierarchy of parameters. Further, the method may comprise tracing, using the traceability matrix, variation in the relative value realization index based upon dynamic variation of one or more parameters.

16 Claims, 5 Drawing Sheets

(56) References Cited

U.S. PATENT DOCUMENTS

| | | | | |
|---|---|---|---|---|
| 2013/0085960 A1* | 4/2013 | Lokku | .................... | G06Q 40/00 |
| | | | | 705/348 |
| 2013/0166355 A1* | 6/2013 | Mohanty | ............ | G06Q 30/0283 |
| | | | | 705/7.35 |
| 2013/0332896 A1* | 12/2013 | Narayana | ............... | G06Q 10/06 |
| | | | | 717/101 |
| 2014/0236866 A1* | 8/2014 | Montgomery | ......... | G06Q 40/04 |
| | | | | 705/36 R |

OTHER PUBLICATIONS

Rajiv D. Banker, Robert J. Kauffman, "Quantifying the Business Value of Information Technology: An Illustration of the 'Business Value Linkage' Framework", New York University, Center for Digital Economy Research, Stern School of Business, Working Paper IS-91-21, Aug. 1991 (38 pages).

* cited by examiner

METHOD AND SYSTEM FOR DYNAMICALLY TRACING A VALUE REALIZED BY AN INFORMATION TECHNOLOGY (IT) SERVICE

CROSS-REFERENCE TO RELATED APPLICATIONS AND PRIORITY

The present application does not claim priority from any patent application.

TECHNICAL FIELD

The present disclosure described herein, in general, relates to information technology (IT) systems and more particularly to a method and system for dynamically tracing a value realized by an Information Technology (IT) service.

BACKGROUND

In the service industry, delivery of services with expected quality is of utmost importance in order to fulfill end user requirements. In the present scenario, the global economy highlights issue of significantly increasing pressure experienced by the service industry to operate at higher speeds to deliver the services with the quality desired and value to cope up with cut throat competition present in the global market. An information technology (IT) service is one of among various other services which have always played a key role in dealing difficulties related to delivery of various services for the industries or organizations. The IT service delivered by an IT vendor may result in generation of a business value for the industry or the organization. Generally, the business value of any industry or an organization is articulated quantitatively based on Return on Investment (ROI) which is widely used to measure the effectiveness of the investment made for the IT services in the industry and also to compute the business value generated by the industry or the organization after implementing the IT services.

Most of traditional methods of articulation of the business value are based on improvement in the quality levels of the service delivered by the IT services. One of such methods, a business value gained by an organization for the qualities procured in the IT services is determined in terms of value realization index (VRI). In this method, the VRI is articulated based upon delivered quality level and promised quality level of the IT services. In the method for articulation of the VRI, the articulation of the VRI is dependent on a single-scale of 0 to 100. Further the present method fails to represent various quality levels of the IT services and hence failed to represent direct measures of various qualities of the IT services.

SUMMARY

This summary is provided to introduce aspects related to method(s) and system(s) for dynamically tracing a value realized by an Information Technology (IT) service and the aspects are further described below in the detailed description. This summary is not intended to identify essential features of the claimed disclosure nor is it intended for use in determining or limiting the scope of the claimed disclosure.

In one implementation, a method for dynamically tracing a value realized by an Information Technology (IT) service is disclosed. The method may comprise generating, by a processor, a correlation matrix representing relationship between a plurality of dimensions associated with an IT service. In one embodiment, the correlation matrix may be generated in form of a plurality of quadrants, wherein each quadrant represents the relationship between at least two dimensions. The method may further comprise capturing a hierarchy of parameters associated with the dimensions. In one aspect, at least one parameter, in the hierarchy, may be contextually related and dependent upon at least one other parameter. Further, the method may comprise computing, by the processor, a relative value realization index (rVRI) using the hierarchy of parameters. In an aspect, the relative value realization index may be indicative of value realized, by the IT service, with respect to the dimensions. Further, the method may comprise generating, by the processor, a traceability matrix indicating correlation between the relative value realization index and the hierarchy of parameters. The method may further comprise tracing, using the traceability matrix, variation in the relative value realization index based upon dynamic variation of one or more parameters in the hierarchy.

In another implementation, a system for dynamically tracing a value realized by an Information Technology (IT) service is disclosed. The system may comprise a processor and a memory coupled to the processor. The processor may be configured to execute programmed instructions stored in the memory. The programmed instructions may comprise instructions for generating a correlation matrix representing relationship between a plurality of dimensions associated with an IT service. In one embodiment, the correlation matrix may be generated in form of a plurality of quadrants, wherein each quadrant represents the relationship between at least two dimensions. The programmed instructions may further comprise instructions for capturing a hierarchy of parameters associated with the dimensions. In one aspect, at least one parameter, in the hierarchy, may be contextually related and dependent upon at least one other parameter. Further, the programmed instructions may comprise instructions for computing a relative value realization index (rVRI) using the hierarchy of parameters. In an aspect, the relative value realization index may be indicative of value realized, by the IT service, with respect to the dimensions. Further, the programmed instructions may comprise instructions for generating a traceability matrix indicating correlation between the relative value realization index and the hierarchy of parameters. The programmed instructions may further comprise instructions for tracing, using the traceability matrix, variation in the relative value realization index based upon dynamic variation of one or more parameters in the hierarchy.

In yet another implementation, a non-transitory computer readable medium embodying a program executable in a computing device for dynamically tracing a value realized by an Information Technology (IT) service is disclosed. The program may comprise a program code for generating a correlation matrix representing relationship between a plurality of dimensions associated with an IT service. In one embodiment, the correlation matrix may be generated in form of a plurality of quadrants, wherein each quadrant represents the relationship between at least two dimensions. The program may further comprise a program code for capturing a hierarchy of parameters associated with the dimensions. In one aspect, at least one parameter, in the hierarchy, may be contextually related and dependent upon at least one other parameter. Further, the program may comprise a program code for computing a relative value realization index (rVRI) using the hierarchy of parameters. In an aspect, the relative value realization index may be indicative of value realized, by the IT service, with respect to the dimensions. Further, the program may comprise a program code for generating a traceability matrix indicating correlation between the relative value realization index and the hierarchy of parameters. The program may further comprise a program code for tracing, using the traceability matrix, variation in the relative value realization index based upon dynamic variation of one or more parameters in the hierarchy.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
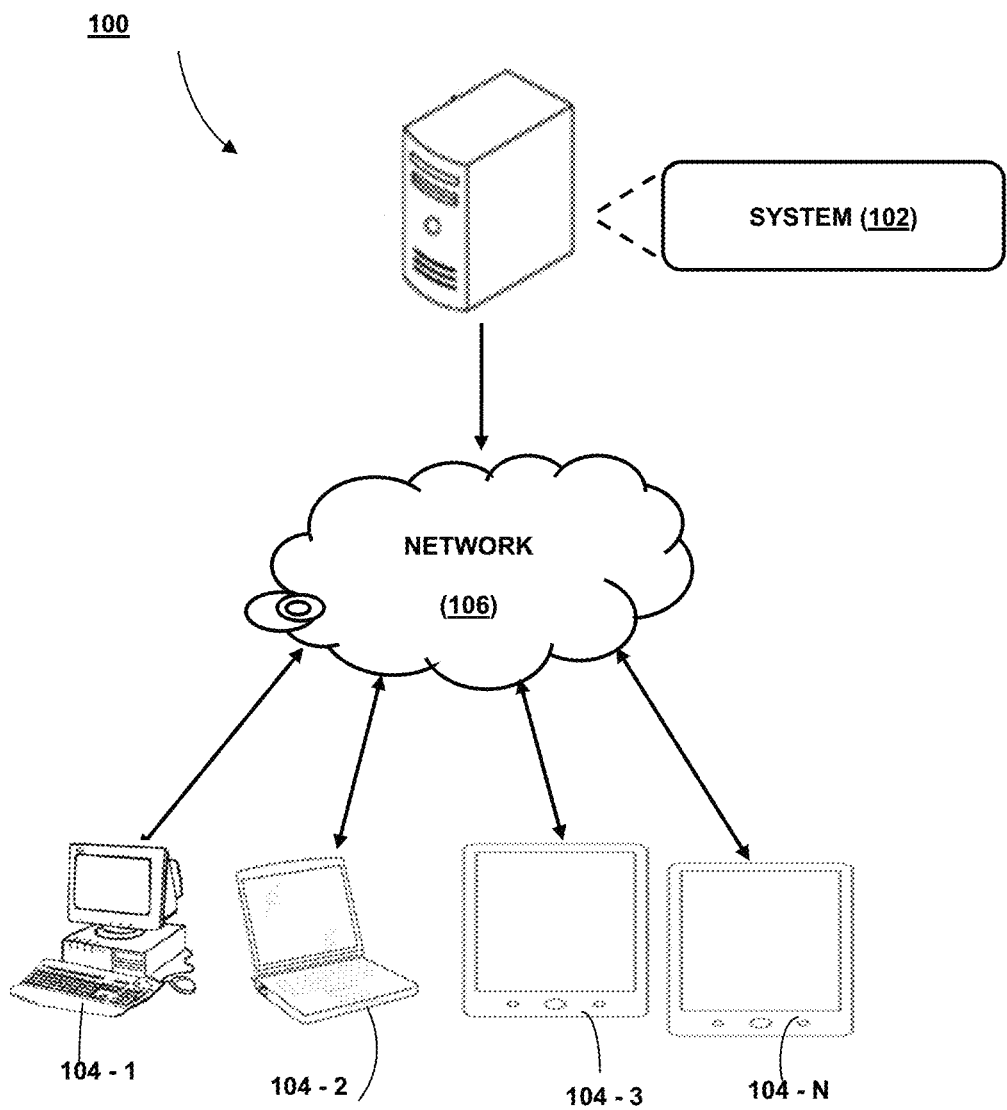
FIG. 1 illustrates a network implementation of a system for dynamically tracing a value realized by an Information Technology (IT) service, in accordance with an embodiment of the present disclosure.

Method(s) and system(s) for dynamically tracing a value realized by an Information Technology (IT) service are described. In one embodiment, there may present one or more IT services which are to be deployed in a framework of an organization. In an exemplary embodiment, the framework may be the IT enabled framework located at the organization premises where the IT services may be implemented. Specifically, the one or more IT services may comprise at least one of Application Development, Application Maintenance, Business Process Outsourcing, the IT consulting and combinations thereof. In one embodiment, the value realized by the IT service may be traced by computing a relative value realization index (rVRI). The computation of rVRI may depend upon various dimensions associated with the IT services. Specifically, the dimensions may include one or more stakeholders, one or more functionalities, one or more qualities, business value, and the like. Inter-relation amongst these dimensions is required for the computation of the rVRI.

In one embodiment, the inter-relation and/or correlation between the aforementioned dimensions may be determined by generating a correlation matrix. The correlation matrix may be generated in form of a plurality of quadrants. In an aspect, the plurality of quadrants may comprise a first quadrant, a second quadrant, a third quadrant and a fourth quadrant. In an embodiment, the first quadrant may represent relation between the one or more stakeholders and the one or more functionalities. The second quadrant may represent relationship between the one or more functionalities and the one or more qualities. The third quadrant may represent relationship between the one or more qualities and the business value. Finally, the fourth quadrant represents relationship between the business value and the one or more stakeholders.

In an embodiment, in order to compute the rVRI, the method(s) and system(s) may capture a plurality of parameters associated with the plurality of dimensions. The plurality of parameters may be captured from a user. In an embodiment, the user may be one of the one or more stakeholders. The plurality of parameters, captured from the user, may be related in a tree manner forming a hierarchy. Further, there exists dependency among the plurality of parameters. Due to the existence of inter-relation and the dependency amongst the plurality of parameters in the hierarchy, the computation of the rVRI may be tedious and the time complexity increases non-linearly. In an embodiment, the plurality of parameters may comprise of an amount invested (INV) by the one or more stakeholders corresponding to the one or more functionalities. The amount invested by the one or more stakeholders may be indicative of the amount invested by the one or more stakeholders for implementation or improvement of the one or more functionalities. The improvement may be required for enhancing quality characteristics of IT products or the IT services, thereby adding a value to the one or more stakeholders in particular and the organization at large.

Further, the plurality of parameters may comprise a first set of weights (W) assigned to the one or more qualities associated with the one or more functionalities. In one aspect, the first set of weights may be received from the user. The weights assigned to the one or more qualities may be indicative of importance of the quality characteristics of a given IT functionality and further the weights may be normalized to a common denominator for aggregated functionality. In one embodiment, the one or more qualities may comprise at least one of reliability, performance efficiency, usability, maintainability, security, compatibility, and portability, and functional suitability as per ISO25010 standard, and one or more sub-qualities of each of the one or more qualities. In an embodiment, the one or more qualities may comprise at least one of current quality level (QC), promised quality level (QP), and delivered quality level (QD).

Furthermore, in one embodiment, the plurality of parameters may comprise quality values associated with the one or more qualities. Implementing a new IT functionality or improving existing IT functionality in the organization is expected to increase the current quality level of the IT services at the stakeholder end. Accordingly, value may be assigned to each quality of the one or more qualities. In an embodiment, the plurality of the parameters may further comprise a numerical value (VF) indicating an existence of a relationship of the one or more functionalities with business units of the organization. The relationship may represent whether or not the given functionality results in addition of a value to the business units of the organization. The value addition to the organization may occur as a result of difference, causing a positive effect, in the delivered quality levels and the promised quality levels. Hence, the value addition may be a result of delivering quality of the IT services beyond the promised quality level. In one embodiment, a transaction price (TrXP) and a business volume (VOL) may also be captured from the user. Also, the plurality of parameters may further comprise a second set of weights (WS) indicative of the weights assigned to the business units based upon revenue generated by the business units of the organization.

According to one embodiment, the method(s) and system(s) may be configured to determine a plurality of attributes based upon the plurality of parameters captured from the user. In one example, the plurality of attributes include a weightage for each quality of the one or more qualities, a relative quality index for each quality, a value addition factor for each quality, a cumulative value addition factor for each business unit, a total value addition by each business unit, an amount of returns gained by the stakeholder from each business unit, and total returns gained by the stakeholder from the business units.

In one embodiment, the determination of the weightage for each quality (WQ) as compared to rest of the qualities of the one or more qualities may be based on the first set of weights (W) and the one or more functionalities. The first set of weights may be indicative of relationship between the quality of the one or more qualities and the functionality of the one or more functionalities. Hence, the weightage for each quality (WQ) may be determined by dividing summation of the first set of weights (W) (the weights assigned to the one or more qualities associated with the one or more functionalities of the IT services) and the one or more functionalities. In an embodiment, the determination of a relative quality index (QI) for each quality may be based on a ratio of the quality values and the weightage (WQ). The ratio of the quality values may represent ratio of difference between the delivered quality level (QD) and the promised quality level (QP) to the promised quality level (QP) and the current quality level (QC). In one embodiment, the value addition factor (VA) for each quality relative to the business units may be determined based on the relative quality index (QI) and the numerical value indicating an existence of the relation of the one or more functionalities with the business units. The value addition factor (VA) may be a result of improved quality characteristic. Further, a cumulative value addition factor (CVA) for each business unit of the business units may be determined based on the value addition factor (VA). The cumulative value addition factor (CVA) may be determined by summation of the value addition factor (VA) for all the qualities. Further, the total value addition (TVA) for each business unit may be determined based on the value addition factor (VA), the transaction price (TAP), and the business volume (VOL). Additionally, total returns gained by the stakeholder (SV_Gain) from the all business units may be determined based on amount of returns gained by the stakeholder (SV_Share) from each business unit. The SV_Share may be determined based on the total value addition (TVA) and the second set of weights (WS). The SV_Share may further indicative of the stakeholder level value share i.e. amount of returns gained by the stakeholder from each business unit, wherein the SV_Share may be based on the second set of weights. The second set of weights (WS) may be further indicative of the weights assigned to the business units based upon the revenue generated by the business units.

In one embodiment, the relative value realization index (rVRI) may be computed corresponding to at least one of a stakeholder level and an organization level. The relative value realization index at the stakeholder level (STAKE_rVRI) may be computed based upon the total returns gained by the stakeholder (SV_Gain) and the amount invested by the stakeholder (INV) in the organization. Further, the relative value realization index at the organization level (ORG_rVRI) may be computed based upon the total value addition (TVA) and the amount invested by the stakeholder (INV). The relative value realization index (rVRI), in other words, may be described as amount of returns obtained over the investments by the one or more stakeholder or investors for the value addition by the IT services.

In one embodiment, the method(s) and system(s) may further generate a traceability matrix indicating correlation between the relative value realization index (rVRI) and the hierarchy of parameters. Further, using the traceability matrix, the method(s) and system(s) may trace variation in the relative value realization index based upon dynamic variation of one or more parameters in the hierarchy. Specifically, the traceability matrix enables visualization of how the parameters captured results in a specific value of the relative value realization index. Such visualization may further allow the user to correlate the plurality of parameters and the relative value realization index. Thus, the traceability matrix provides inferences or insights in order to interpret as to why the value of relative value realization index is low or high. Further, for each variation of one or parameters, the traceability matrix is highlighted with a different color or hue to comprehend the complexity and justify the decisions made based on the parameters captured. While aspects of the described method and system for dynamically tracing a value realized by an Information Technology (IT) service may be implemented in any number of different computing systems, environments, and/or configurations, the embodiments are described in the context of the following exemplary system.

Referring now to FIG. 1, a network implementation 100 of a system 102 for dynamically tracing a value realized by an Information Technology (IT) service is illustrated, in accordance with an embodiment of the present disclosure. Although the present disclosure is explained considering that the system 102 is implemented as a server, it may be understood that the system 102 may also be implemented in a variety of computing systems, such as a laptop computer, a desktop computer, a notebook, a workstation, a mainframe computer, and the like. In one implementation, the system 102 may be implemented in a cloud-based environment. It will be understood that the system 102 may be accessed by multiple users through one or more user devices 104-1, 104-2 . . . 104-N, collectively also referred to as a user device 104, or a user 104, hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
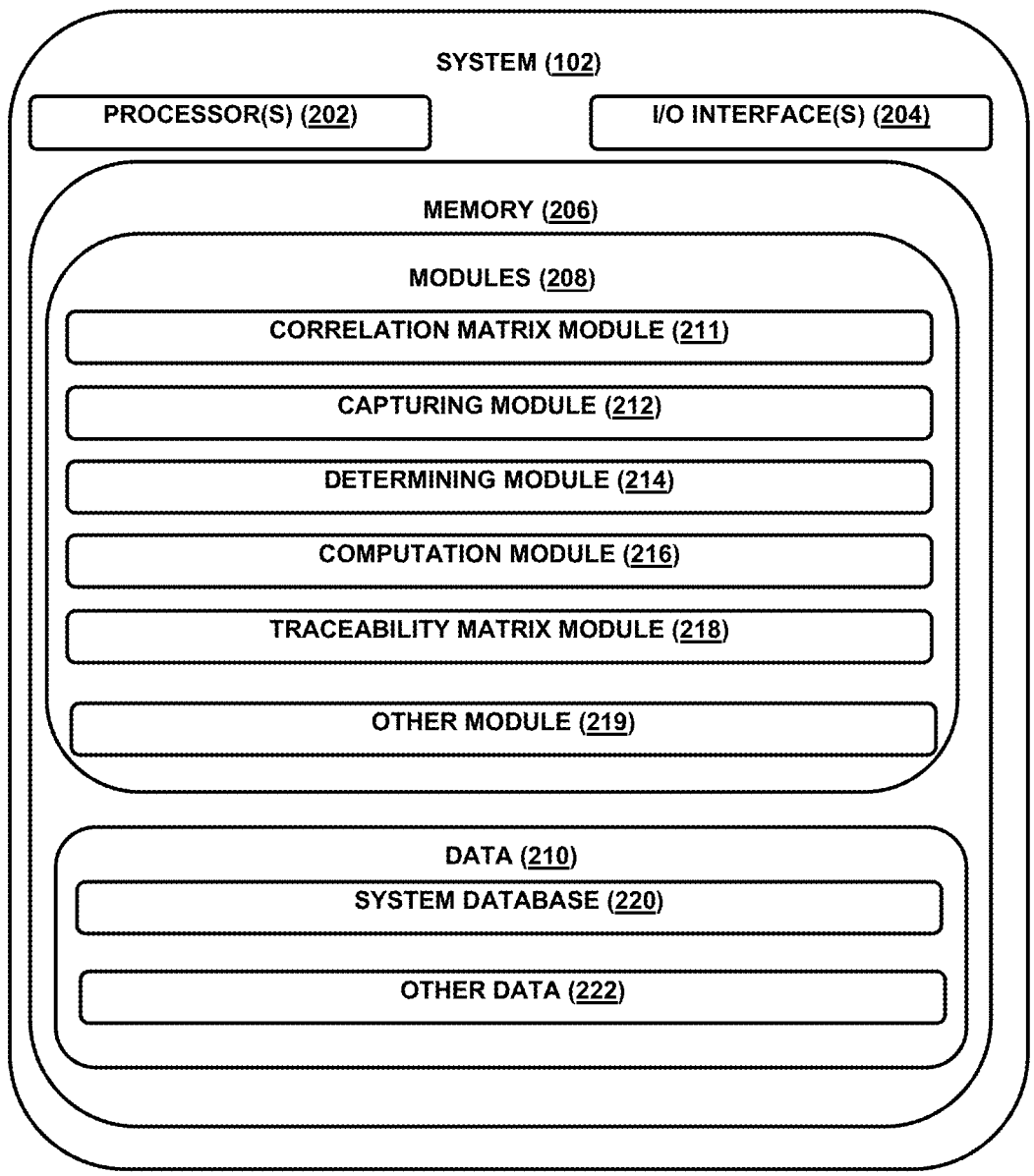
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user device 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one embodiment, the modules include programmed instructions that may be executed by the processor 202. In one implementation, the modules 208 may include a correlation matrix module 211, a capturing module 212, a determining module 214, a computation module 216, a traceability matrix module 218 and other module 219. The other module 219 may include programs or coded instructions that supplement applications and functions of the system 102.

The data 210, amongst other things, serves as a repository for storing data processed, received, and generated by one or more of the modules 208. The data 210 may also include the system database 220 and other data 222. The other data 222 may include data generated as a result of the execution of one or more modules in the other module 219.

In one implementation, at first, a user may use the user device 104 to access the system 102 via the I/O interface 204. The user may register themselves using the I/O interface 204 in order to use the system 102. The working of the system 102 using the plurality of modules 208 along with other components is explained in detail referring to FIG. 3 as explained below.

Correlation Matrix Module 211

Figure 3:
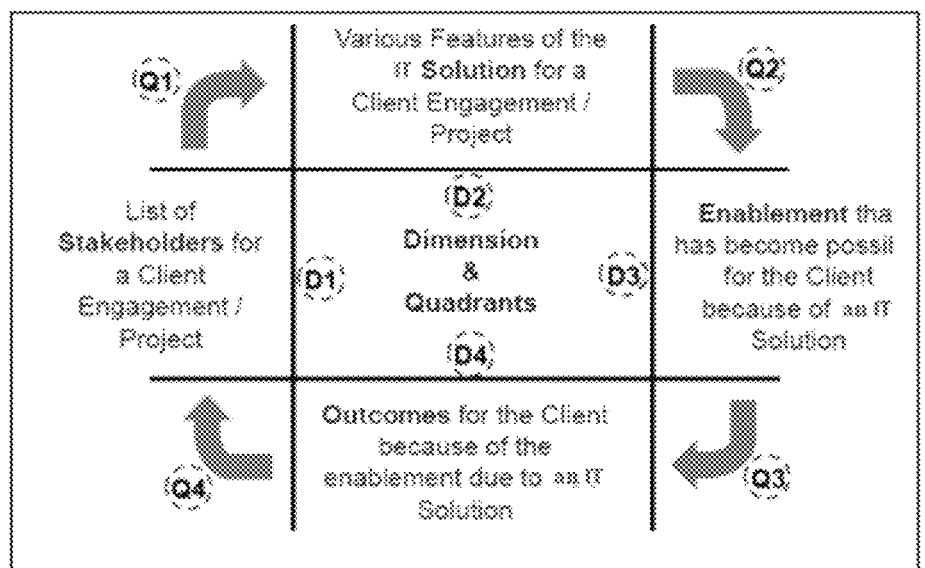
FIG. 3 illustrates a correlation matrix representing relationship between various dimensions associated with the IT service, in accordance with an embodiment of the present disclosure.

In an embodiment, the correlation matrix module 211 may be configured to generate a correlation matrix representing relationship between a plurality of dimensions associated with an IT service. In an embodiment, the correlation matrix may be generated in form of a plurality of quadrants. Further, in the correlation matrix, each quadrant represents the relationship between at least two dimensions. In one example, the dimensions comprise one or more stakeholders, one or more functionalities, one or more qualities and a business value. FIG. 3 illustrates an exemplary correlation matrix comprising a plurality of quadrants including Q1, Q2, Q3 and Q4. Further, the correlation matrix shows correlation between the dimensions D1, D2, D3 and D4 using the plurality of quadrants including Q1, Q2, Q3 and Q4. D1 herein indicates the one or more stakeholders, D2 indicates the one or more functionalities, D3 indicates the one or more qualities and D4 indicates the business value. As illustrated in FIG. 3, the quadrant Q1 represents the relationship or correlation between the dimensions D1 and D2. Further, the quadrant Q2 represents the relationship or correlation between the dimensions D2 and D3. Further, the quadrant Q3 represents the relationship or correlation between the dimensions D3 and D4. Furthermore, the quadrant Q4 represents the relationship or correlation between the dimensions D4 and D1. It is to be noted that the correlation matrix is capable of capturing many to many relationship between the dimensions and the cycle helps to trace through all the dimensions (D1 to D4) in both clockwise and anti clockwise directions.

In an embodiment, the dimension D1 (one or more stakeholders) represents a list of stakeholders for a client/engagement project. Further, the dimension D2 (one or more functionalities) represents various features of the IT product/solution/service for the client/engagement project. Further, the dimension D3 (one or more qualities) represents an enablement that has become possible for the client because of the IT product/solution/service. Furthermore, the dimension D4 (business value) represents outcomes for the client because of the IT product/solution/service. Further, the system 102 may be configured to capture a hierarchy of parameters associated with the plurality of dimensions in order to compute the relative value realization index, as explained in detail as below.

Capturing Module 212

In an embodiment, the capturing module 212 may be configured to capture a plurality of parameters from a user. Alternatively, the plurality of parameters may be captured from a plurality of users. In one embodiment, the user may be one of a stakeholder amongst the plurality of stakeholders. The plurality of stakeholders may collectively form an organizational hierarchy of the organization. The organizational hierarchy may include higher management personals, team managers, team leads and associates. Similarly, the one or more IT services may be hierarchically represented in a manner such that each IT service further comprises a sub-service, and the sub-service further comprises another sub-service. In one example, the one or more IT services may be associated with software development services, application maintenance services, consulting services and outsourcing services. In one embodiment, the one or more qualities comprise reliability, performance efficiency, usability, maintainability, security, compatibility, portability, as per ISO 25010 standards, and one or more sub-qualities of each of the one or more qualities of the one or more IT services. The one or more qualities may be hierarchically represented in a manner such that each quality further comprises one or more sub-qualities that are measurable.

In one embodiment, weights (W) assigned to each quality may be indicative of priorities assigned to each of the qualities depending on the business needs of the organization. The weights (W) may be directly associated with the perception of the user. More specifically the weights (W) may be directly associated with the users' perception of prioritizing the one or more qualities. In one embodiment, the weights (W) captured from the user may be in form of a value irrespective of unit or may be in form of a percentage value depicting the priority of each of the one or more qualities. It may be important to note that the system implemented for computing the relative value realization index (rVRI) does not take in to consideration single-scale to represent the quality levels of the IT services. Further, the quality levels may be measured in the natural units of measurement and therefore are intuitive. The organization implementing the one or more IT services may have different priorities and perceptions.

The capturing module 212 may be further configured to capture the plurality of parameters like the amount invested by the stakeholder corresponding to one or more functionalities associated with the IT service, the first set of weights (W) assigned to one or more qualities associated with the one or more functionalities, the quality values associated with the one or more qualities, the numerical value indicating an existence of a relation of the one or more functionalities with the business units, the transaction price (TrXP), the business volume (VOL), and the second set of weights (WS) assigned to the business units based upon the revenue generated by the business units. Upon capturing the plurality of parameters, the plurality of parameters may be stored in the system database 220 for further use.

In one example, the plurality of parameters may be captured by the plurality of quadrants (Q1, Q2, Q3 and Q4) depending upon the dimensions (D1, D2, D3 and D4) corresponding to which the parameters are captured. For example, the quadrant Q1 may capture investments spend by the stakeholders (D1) for the one or more functionalities (D2). Specifically, the quadrant Q1 captures IT spend by the one or more stakeholders on various IT initiatives. It is to be noted that organization investment is the sum of all the investments made by stakeholders across various functionalities. Further, the quadrant Q2 may capture weights assigned to the one or more functionalities (D2) with respect to the one or more qualities (D3). Specifically, each of the functionalities is assigned with a weight for a quality that has an impact. The summation of weights assigned to each of the functionalities is 100. Additionally, the values of current quality (Qc), promised quality (Qp) and delivered quality (Qd) corresponding to the one or more qualities (D3) with respect to the one or more functionalities (D2) may be captured by the quadrant Q2.

Further, the quadrant Q3 may capture weights indicating mappings between the one or more qualities (D3) and the business value (D4). Improvement of the one or more qualities is associated to value per unit of business transaction. This is a many to many relationship. The quadrant Q3 may also capture Business Value Metrics, Impact and volume of business transactions. Finally, the quadrant Q4 may capture the relationship between the Business Value (D4) and the one or more stakeholders (D1). Specifically, the quadrant Q4 captures the weights assigned by the one or more stakeholders (D1) to the business units based upon the Business Value (D4) or revenue generated by the business units. Further, the system 102 may be configured to determine a plurality of attributes based upon the plurality of parameters captured using the determining module 214 as explained below.

Determining Module 214

In an embodiment, the determining module 214 may be configured to determine the plurality of attributes. The plurality of attributes may include the weightage (W) for each quality of the one or more qualities, the relative quality index for each quality (QI), the value addition factor (VA) for each quality, the cumulative value addition factor (CVA) for each business unit, the total value addition (TVA) by each business unit, amount of returns gained (SV_Share) by the stakeholder i.e. stakeholder level value share of each stakeholder, from each business unit, and the total returns gained by the stakeholder (SV_Gain) from all the business units. The determination of the attributes may be based on the plurality of parameters captured from the user. Detailed methodology of determining each of the attributes may be explained along with appropriate formulae as illustrated below. Further, the methodology may be explained through several equations (equations 1 to 9) as mentioned below, wherein for each equation from 1 to 9— i represent the number of functionalities ranging from 1, 2, 3 ... to m, j represents the number of qualities ranging from 1, 2, 3 ... to n, k represents to the number of business units ranging from 1, 2, 3 ... to t, and q represents to the number of stakeholders ranging from 1, 2, 3 ... to r.

The weightage (WQ) for each quality of the one or more qualities may be determined based on the first set of weights (W) and the one or more functionalities. The first set of weights (W) may be indicative of the weights assigned to one or more qualities associated with the one or more functionalities of the one or more IT services. For the purpose of determining the weightage, equation 1 may be used.

$$WQ_{1j} = \frac{\sum_{i=1}^{m} W_{ij}}{m*100} \qquad \text{equation 1}$$

wherein, WQ represents the weightage for each quality of the one or more qualities as compared to rest of the qualities, and W represents the first set of weights.

Furthermore, the relative quality index (QI) for each quality may be determined based on the ratio of the quality values and the weightage (WQ) determined for each quality. For the determination of the QI, equation 2 may be used.

$$QI_{ij} = \frac{w_{ij}}{\sum_{i=1}^{m} w_{ij}} * WQ_{1j} * \frac{(QD_{ij} - QP_{ij})}{(QP_{ij} - QC_{ij})}, \qquad \text{equation 2}$$

Wherein, QI indicates the relative quality index for each quality,

W corresponds to the first set of weights,

WQ represents the weightage for each quality,

QD represents the quality value for the delivered quality,

QP represents the quality value for the promised quality, and

QC represents the quality value for the current quality.

The ratio of the quality values may represent ratio of difference between the delivered quality level (QD) and promised quality level (QP) to the promised quality level (QP) and the current quality level (QC) for all functionalities.

In an embodiment, the value addition factor (VA) for each quality relative to the business units may be determined based on the relative quality index (QI) and the numerical value indicating an existence of a relation of the one or more functionalities with the business units. The value addition factor (VA) may be determined by using equation 3 as mentioned below.

$$VA_{kj} = \text{Matrix Multiplication}(VF_{ki}, QI_{ij}) * \frac{1}{\sum_{i=1}^{m} VF_{ki}} \quad \text{equation 3}$$

Wherein, VA corresponds to the value addition factor,
VF represents the business value, and
QI stands for the relative quality index for each quality.

In one embodiment, cumulative value addition factor (CVA) for each business unit of the business units may be determined based on the value addition factor (VA). The cumulative value addition factor (CVA) may be determined by using equation 4.

$$CVA_{k1} = \sum_{j=1}^{n} VA_{kj} \quad \text{equation 4}$$

Wherein, CVA indicates the cumulative value addition factor, and
VA corresponds to the value addition factor.

Also, the total value addition (TVA) for each business unit may be determined based on the value addition factor (VA), the transaction price (TrXP) and the business volume (VOL). For determining the total value addition equation 5 may be used.

$$TVA_{k1} = CVA_{k1} * TrXP_{k1} * VOL_{k1} \quad \text{equation 5}$$

Wherein, TVA indicates the total value addition by each business unit,
CVA represents the cumulative value addition factor,
TrXP stands for the transaction price, and
VOL corresponds to the business volume.

Moreover, the total returns gained by the stakeholder (SV_Gain) from all the business units may be determined based on the amount of returns gained by the stakeholder (SV_Share) from each business unit. The SV_Share may indicative of value share of each of the stakeholder. The amount of returns gained by the stakeholder (SV_Share) may be determined based on the total value addition (TVA) and the second set of weights. The equation 6 may be used for this purpose.

$$SV\_Share_{kq} = TVA_{k1} * \frac{WS_{kq}}{\sum_{q=1}^{r} WS_{kq}} \quad \text{equation 6}$$

Wherein, SV_Share represents the amount of returns gained by the stakeholder,
TVA indicates the total value addition by each business unit, and
WS stands for the second set of weights.

Furthermore, for determining the total returns gained by the stakeholder from the business units equation 7 may be used.

$$SV\_Gain_{1q} = \sum_{k=1}^{t} SV\_Share_{kq} \quad \text{equation 7}$$

Wherein, SV_Gain corresponds to the total return gained by the stakeholder from all the business units, and SV_Share indicates the amount of returns gained by the stakeholder i.e. value share of each stakeholder from each of the business units. The system 102 may further compute a relative value realization index (rVRI) based upon the plurality of parameters captured and the plurality of attributes determined using a computation module 216 as explained herein below.

Computation Module 216

The system 102 may further comprise the computation module 216. The computation module 216 may be configured to compute the relative value realization index (rVRI) associated with one of the stakeholder and the organization. In one embodiment, the rVRI may be indicative of the return on investment as consequence of the value addition of a given service in the organization. The value addition may further represent the magnitude of impact of the given functionality on a particular business unit, wherein the impact may be quantified on a common scale for different quality characteristics, the functionalities and the value addition.

The rVRI associated with the stakeholder may be computed based on the total returns gained by the stakeholder (SV_Gain) and the amount invested by the stakeholder (INV) in the organization. For determining the relative value realization index associated with the stakeholder equation 8 may be used.

$$STAKE\_rVRI_{iq} = \frac{SV\_Gain_{iq}}{\sum_{i=1}^{m} INV_{iq}} \quad \text{equation 8}$$

Wherein, STAKE_rVRI indicates the relative value realization index (rVRI) associated with the stakeholder,
SV_Gain corresponds to the total return gained by the stakeholder, and
INV stands for the amount invested by the stakeholder.

Furthermore, the relative value realization index associated with the organization is computed based upon the total value addition and the amount invested by the stakeholder. For this purpose the equation 9 may be used.

$$ORG\_rVRI = \frac{\sum_{k=1}^{t} TVA_{k1}}{\sum_{i=1,q=1}^{m,r} INV_{iq}} \quad \text{equation 9}$$

Wherein, ORG_rVRI indicates the relative value realization index (rVRI) associated with the organization,
TVA corresponds to the total value addition by each business unit, and
INV stands for the amount invested by the stakeholder.

In an exemplary embodiment, the aforementioned methodology of determining the attributes and computing the rVRI associated with one of the stakeholder and the organization is explained in detail, through various steps, with a help of an example as mentioned below. In this example, an organization named "ABC" is considered implementing an Information Technology (IT) service. In this example, assume the organization "ABC" has four different dimensions like stakeholder, function, quality and value. Further, consider that there are three stakeholders investing a specific amount into the organization "ABC" for implementation of the IT service. Further, consider that the IT service has five functionalities over which the stakeholders invested certain amount of money. Furthermore, consider that the organization "ABC" comprises eight business units working within the organization.

1. The stakeholder is represented by ($S_q$), where q=1, 2, 3 . . . r (for this example r=3) has invested an amount ($INV_{iq}$) on the functionalities represented by ($F_i$), where i=1, 2, 3 . . . m (for this example m=5). According to the present example, table 1 illustrates the amount invested by each stakeholder.

TABLE 1

The amount invested by the stakeholder

| $INV_{iq}$ | S1 | S2 | S3 |
|---|---|---|---|
| F1 | 1000 | 0 | 500 |
| F2 | 0 | 500 | 100 |
| F3 | 500 | 750 | 0 |
| F4 | 750 | 0 | 1000 |
| F5 | 5000 | 5000 | 5000 |

2. According to the present example each of the functionality $F_i$ has four qualities. The quality is denoted by $Q_j$ where j=1, 2, 3 . . . n, (for this example n=4). Table 2 illustrates the weights assigned to these four qualities associated with the five functionalities.

TABLE 2 the weights assigned to the qualities

| $W_{ij}$ | Q1 | Q2 | Q3 | Q4 |
|---|---|---|---|---|
| F1 | 25 | 25 | 0 | 50 |
| F2 | 25 | 25 | 25 | 25 |
| F3 | 0 | 50 | 0 | 50 |
| F4 | 10 | 0 | 75 | 15 |
| F5 | 25 | 0 | 40 | 35 |

3. The weightage for each quality is determined based on the weights assigned to these four qualities ($W_{ij}$) by the stakeholder in step 2 and the five functionalities by using aforementioned equation 1.

$$WQ_{1j} = \frac{\sum_{i=1}^{m} w_{ij}}{m*100}$$

Table 3 illustrates the weightage obtained for each quality corresponding to all the functionalities. The values in the table 3 are obtained by using the equation 1.

The weightage for $Q_1$ i.e. $WQ_{11}$ is determined as follows—

$$WQ_{11} = W_{11}/(m*100)$$
$$= (25+25+10+25)/(5*100)$$
$$= 85/500$$
$$= 0.17.$$

Here m=5.
Similarly above step 3 is repeated for all the qualities.

TABLE 3 the weightage for each quality

| $WQ_{1j}$ | Q1 | Q2 | Q3 | Q4 |
|---|---|---|---|---|
| | 0.17 | 0.2 | 0.28 | 0.35 |

4. The quality values associated with the four qualities are assigned by the user as illustrated in tables 4a, 4b, and 4c below.

TABLE 4a the quality values for the current quality level entered by the user

| $QC_{ij}$ | Q1 | Q2 | Q3 | Q4 |
|---|---|---|---|---|
| F1 | 60 | 40 | 80 | 60 |
| F2 | 50 | 80 | 25 | 40 |
| F3 | 90 | 25 | 50 | 60 |
| F4 | 60 | 60 | 50 | 40 |
| F5 | 40 | 50 | 75 | 80 |

TABLE 4b the quality values for the promised quality level entered by the user

| $QP_{ij}$ | Q1 | Q2 | Q3 | Q4 |
|---|---|---|---|---|
| F1 | 70 | 60 | 85 | 80 |
| F2 | 70 | 85 | 90 | 60 |
| F3 | 75 | 90 | 70 | 70 |
| F4 | 80 | 75 | 70 | 60 |
| F5 | 60 | 70 | 85 | 85 |

TABLE 4c the quality values for the delivered quality level entered by the user

| $QD_{ij}$ | Q1 | Q2 | Q3 | Q4 |
|---|---|---|---|---|
| F1 | 80 | 60 | 90 | 99 |
| F2 | 70 | 90 | 80 | 70 |
| F3 | 95 | 80 | 75 | 80 |
| F4 | 99 | 80 | 75 | 60 |
| F5 | 70 | 70 | 90 | 90 |

5. In the next step relative quality index is determined by using the equation 2.

$$QI_{ij} = \sum_{i=1}^{m^{w_{ij}}} w_{ij} * WQ_{1j} * \frac{(QD_{ij} - QP_{ij})}{(QP_{ij} - QC_{ij})}$$

Values are input into the given formula and the relative quality index for each quality is determined Table 5 illustrates the relative quality index for each quality. Now, the relative quality index for the function $F_1$ is determined as—

$$QI_{11} = (25/85)*0.17*((80-70)/(70-60))$$
$$= 0.05.$$

Similarly rest of the QIs is determined by performing the step 5.

TABLE 5

| $QI_{ij}$ | Q1 | Q2 | Q3 | Q4 |
|---|---|---|---|---|
| F1 | 0.05 | 0.00 | 0.00 | 0.10 |
| F2 | 0.00 | 0.05 | −0.01 | 0.03 |
| F3 | 0.00 | −0.02 | 0.00 | 0.10 |
| F4 | 0.02 | 0.00 | 0.04 | 0.00 |
| F5 | 0.03 | 0.00 | 0.04 | 0.07 |

6. In next step a numerical value ($VF_{ki}$) indicating an existence of a relation of the five functionalities (Fi) with the business units ($V_k$) (for this example there are eight business units) is obtained from the user.

If the relation exists between $F_i$ and $V_k$ then $VF_{ki}=A$ positive real number, If no relation exists between $F_i$ and $V_k$ then $VF_{ki}=0$.

And $\forall F_i \; \exists$ at least one $V_k$ such that $VF_{ki} \neq 0$.

Table 6 represents all the $VF_{ki}$ captured.

TABLE 6

| $VF_{ki}$ | F1 | F2 | F3 | F4 | F5 |
|---|---|---|---|---|---|
| V1 | 1 | 1 | 0 | 0 | 1 |
| V2 | 0 | 1 | 0 | 0 | 1 |
| V3 | 1 | 0 | 0 | 0 | 1 |
| V4 | 0 | 1 | 1 | 0 | 1 |
| V5 | 0 | 0 | 1 | 1 | 0 |
| V6 | 1 | 1 | 0 | 1 | 0 |
| V7 | 0 | 1 | 1 | 1 | 0 |
| V8 | 0 | 0 | 1 | 1 | 0 |

7. A value addition factor ($VA_{kj}$) is then determined based on a matrix of the $VF_{ki}$ obtained in the step 6 (i.e. the table 6) and a matrix of the relative quality index (i.e. the table 5) by using the equation 3.

$$VA_{kj} = \text{Matrix Multiplication}(VF_{ki}, QI_{ij}) * \frac{1}{\sum_{i=1}^{m} vr_{ki}}.$$

Table 7a illustrates values obtained after multiplying two matrices i.e. $VF_{ki}$ and $QI_{ij}$. The table 7a is obtained by performing matrix multiplication.

TABLE 7a

Matrix Multiplication

| Matrix Multiplication $(VF_{ki}, QI_{ij})$ | Q1 | Q2 | Q3 | Q4 |
|---|---|---|---|---|
| V1 | 0.075 | 0.050 | 0.032 | 0.190 |
| V2 | 0.025 | 0.050 | 0.032 | 0.095 |
| V3 | 0.075 | 0.000 | 0.040 | 0.165 |
| V4 | 0.025 | 0.035 | 0.032 | 0.195 |
| V5 | 0.019 | −0.015 | 0.038 | 0.100 |
| V6 | 0.069 | 0.050 | 0.030 | 0.120 |
| V7 | 0.019 | 0.035 | 0.030 | 0.125 |
| V8 | 0.019 | −0.015 | 0.038 | 0.100 |

Table 7b illustrates the value addition factor ($VA_{kj}$) determined for each business unit. Hence for obtaining values in the table 7b, the values from the table 7a are divided by summation of the table 6 above.

$VA_{11}=0.075/3=0.025$. Similarly, rest all values are determined.

TABLE 7b the value addition factor

| $VA_{kj}$ | Q1 | Q2 | Q3 | Q4 |
|---|---|---|---|---|
| V1 | 0.025 | 0.017 | 0.011 | 0.063 |
| V2 | 0.013 | 0.025 | 0.016 | 0.048 |
| V3 | 0.038 | 0.000 | 0.020 | 0.083 |
| V4 | 0.008 | 0.012 | 0.011 | 0.065 |
| V5 | 0.010 | −0.008 | 0.019 | 0.050 |
| V6 | 0.023 | 0.017 | 0.010 | 0.040 |
| V7 | 0.006 | 0.012 | 0.010 | 0.042 |
| V8 | 0.010 | −0.008 | 0.019 | 0.050 |

8. In next step, a cumulative value addition factor ($CVA_{k1}$) is determined based on the value addition factor as determined in the step 7. Table 8 illustrates the cumulative value addition factor obtained by using the equation 4.

$CVA_{k1} = \sum_{j=1}^{n} VA_k$.

$CVA_{11} = (0.025+0.017+0.011+0.063) = 0.116$.

Similarly rest all CVAs are determined.

TABLE 8 the cumulative value addition factor

| $CVA_{k1}$ | |
|---|---|
| V1 | 0.116 |
| V2 | 0.101 |
| V3 | 0.140 |
| V4 | 0.096 |
| V5 | 0.071 |
| V6 | 0.090 |
| V7 | 0.069 |
| V8 | 0.071 |

9. A total value addition ($TVA_{k1}$) by each business unit is determined by using the equation 5.

$TVA_{k1} = CVA_{k1} * TrXP_{k1} * VOL_{k1}$

Table 9a illustrates transaction price ($TrXP_{k1}$) captured from the user, whereas table 9b illustrates business volume ($VOL_{k1}$) captured from the user. Further, table 9c illustrates the total value addition (TVA) by each business unit.

| $TrXP_{k1}$ | | $TVA_{k1}$ | | $VOL_{k1}$ | |
|---|---|---|---|---|---|
| V1 | 50.00 | V1 | 578.85 | V1 | 100 |
| V2 | 1.00 | V2 | 505.77 | V2 | 5000 |
| V3 | 2.50 | V3 | 350.00 | V3 | 1000 |
| V4 | 50.00 | V4 | 478.21 | V4 | 100 |
| V5 | 5.00 | V5 | 352.79 | V5 | 1000 |
| V6 | 100.00 | V6 | 448.01 | V6 | 50 |
| V7 | 1000.00 | V7 | 694.74 | V7 | 10 |
| V8 | 50.00 | V8 | 529.18 | V8 | 150 |

10. In the next step the user assigns weights ($WS_{kq}$) to the business units based upon revenue generated by the business units. Table 10 illustrates the respective weights assigned.

TABLE 10

| $WS_{kq}$ | S1 | S2 | S3 |
|---|---|---|---|
| V1 | 0 | 0 | 100 |
| V2 | 0 | 50 | 50 |
| V3 | 30 | 20 | 50 |

TABLE 10-continued

| $WS_{kq}$ | S1 | S2 | S3 |
| --- | --- | --- | --- |
| V4 | 0 | 100 | 0 |
| V5 | 100 | 0 | 0 |
| V6 | 0 | 0 | 0 |
| V7 | 0 | 0 | 0 |
| V8 | 0 | 0 | 0 |

An amount of returns gained by the stakeholder from each business unit based on the total value addition and the second set of weights ($WS_{kq}$) is determined by using the equation 6 i.e.

$$SV\_Share_{kq} = TVA_{k1} * \frac{WS_{kq}}{\sum_{q=1}^{r} WS_{kq}}$$

11. Table 11 illustrates the amount of returns gained by the stakeholder.

TABLE 11

| $SV_{kq}$ | S1 | S2 | S3 |
| --- | --- | --- | --- |
| V1 | 0 | 0 | 579 |
| V2 | 0 | 253 | 253 |
| V3 | 105 | 70 | 175 |
| V4 | 0 | 478 | 0 |
| V5 | 353 | 0 | 0 |
| V6 | 0 | 0 | 0 |
| V7 | 0 | 0 | 0 |
| V8 | 0 | 0 | 0 |

A total return gained by the stakeholder from the business units is determined based on the amount of returns gained by the stakeholder from each business unit and by using the equation 7 i.e.

$$SV\_Gain_{1q} = \sum_{k=1}^{t} SV\_Share_{kq}.$$

12. Table 12 illustrates the total return gained by the stakeholder from the business units.

TABLE 12

| SV_Gain | S1 | S2 | S3 |
| --- | --- | --- | --- |
| | 458 | 801 | 1007 |

13. In the final step the relative value realization index at the stakeholder level and the organization level is determined by using equation 8 and 9 respectively.

$$STAKE\_rVRI_{1q} = \frac{SV\_Gain_{1q}}{\sum_{i=1}^{m} INV_{iq}}$$

and $$ORG\_rVRI = \frac{\sum_{k=1}^{t} TVA_{k1}}{\sum_{i=1,q=1}^{m,r} INV_{iq}}$$

Table 13a and 13b illustrates the rVRI associated with the stakeholder and rVRI associated with the organization respectively.

TABLE 13a

| $STAKE\_rVRI_{1q}$ | S1 | S2 | S3 |
| --- | --- | --- | --- |
| | 0.06 | 0.13 | 0.15 |

TABLE 13b

| ORG_rVRI |
| --- |
| 0.20 |

Hence the value for rVRI obtained by using the method at the organization level for the organization explained in the given example comes to 0.20. The value obtained for the ORG_rVRI signifies the value gained by the organization due to implementation of the IT service. The system 102 may be further configured to trace correlation between the relative value realization index and the plurality of parameters using the traceability matrix module 218, functionality of which is explained in detail as below.

Traceability Matrix Module 218

Figure 4:
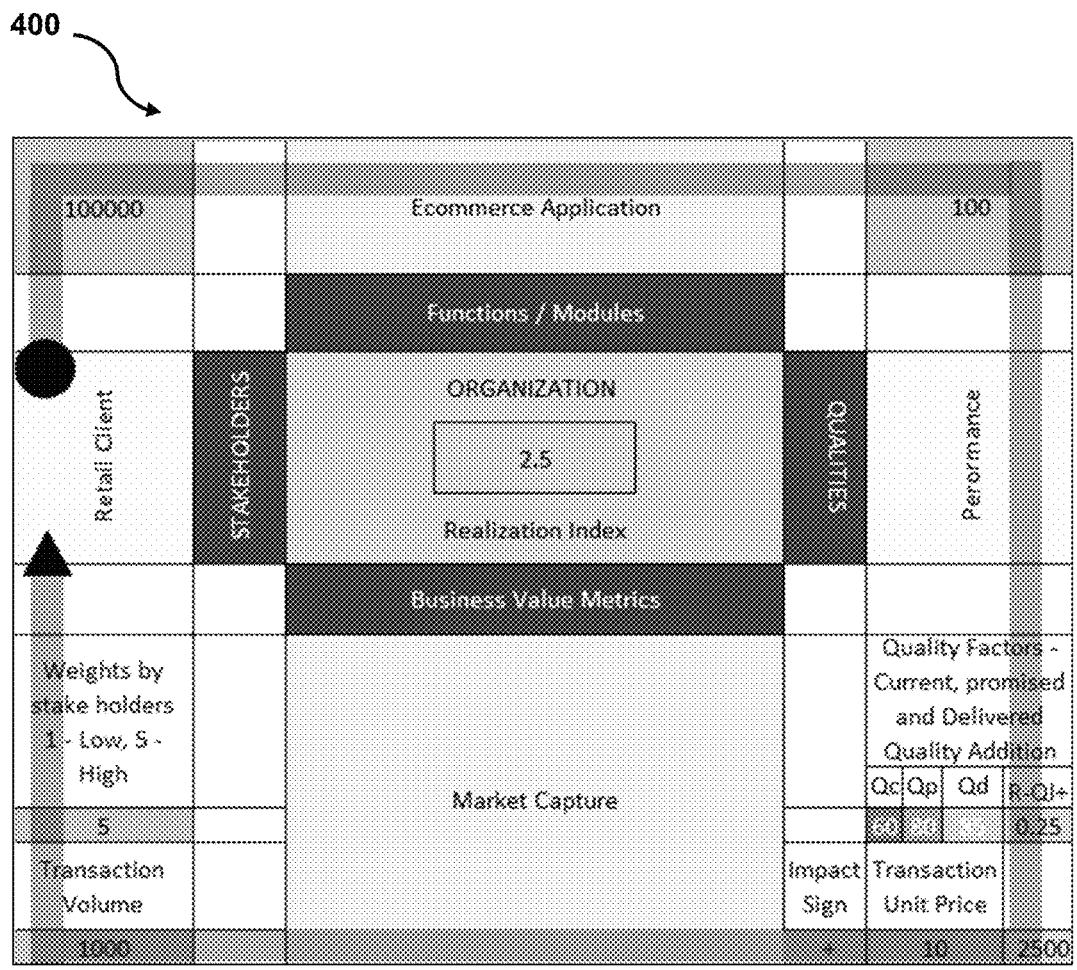
FIG. 4 illustrates a traceability matrix representing correlation between the rVRI and the plurality of parameters associated with the various dimensions, in accordance with an embodiment of the present disclosure.

In one embodiment, the traceability matrix module 218 may be configured to generate a traceability matrix indicating correlation between the relative value realization index (rVRI) and the hierarchy of parameters. Further, using the traceability matrix, the traceability matrix module 218 may be configured to trace variation in the relative value realization index based upon dynamic variation of one or more parameters in the hierarchy. Specifically, the traceability matrix, generated by the traceability matrix module 218, may enable visualization of how the parameters captured results in a specific value of the relative value realization index. Such visualization may further allow the user to correlate the plurality of parameters and the relative value realization index. Thus, the traceability matrix may provide inferences or insights in order to interpret as to why the value of relative value realization index is low or high. Further, for each variation of one or parameters, the traceability matrix is highlighted with a different color or hue to comprehend the complexity and justify the decisions made based on the parameters captured. FIG. 4 illustrates an exemplary traceability matrix 400 generated by the traceability matrix module 218. As shown in FIG. 4, the traceability matrix 400 shows the relative value realization index having a value of 2.5 which is realized by an organization for an ecommerce application based upon the parameters such as weights provided (in the scale of 1-5, 1 being low, 5 being 5) by the stakeholders, transaction volume of 1000, current quality ($Q_c$) of 60, promised quality ($Q_p$) of 80 and delivered quality ($Q_d$) of 85, relative quality index of 0.25, transaction per price of 10 and other business metrics etc. It is to be noted that the variation of each of these parameters dynamically results in dynamic variation of the relative value realization index. This facilitates the user to trace in real time the impact of variation of the plurality of parameters related to the dimensions on the value gained by the user or the organization.

Exemplary embodiments discussed above may provide certain advantages. Though not required to practice aspects of the disclosure, these advantages may include those provided by the following features.

Some embodiments of the present disclosure allow consideration of relative contribution of software non-functional qualities to business value.

Some embodiments of the present disclosure that allow traceability among elements of various dimensions i.e. a mechanism to show a plot of connected dimensions, namely, stakeholders, IT functionality, qualities and value.

Some embodiments of the present disclosure facilitate normalizing stakeholders' individual perception to an accepted level within the relevant stakeholders.

Some embodiments of the present disclosure allow conversion of stakeholders' individual perception to an organization level by organizational priorities.

Figure 5:
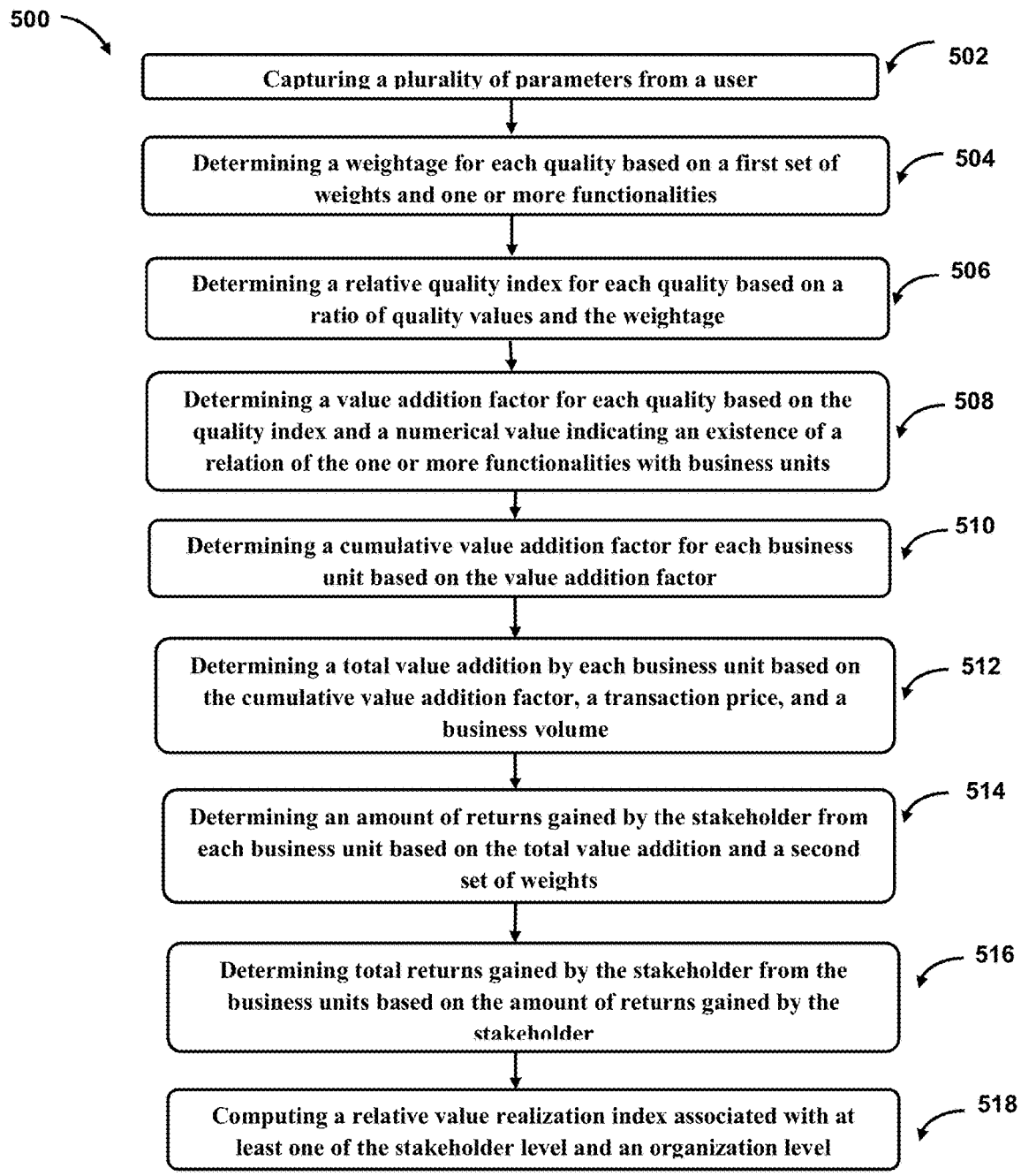
FIG. 5 illustrates a method for dynamically tracing a value realized by an Information Technology (IT) service, in accordance with an embodiment of the present disclosure.

Referring now to FIG. 5 a method 500 for dynamically tracing a value realized by an Information Technology (IT) service, is shown, in accordance with an embodiment of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the disclosure described herein. Furthermore, the method can be implemented in any suitable hardware, software, firmware, or combination thereof. However, for ease of explanation, in the embodiments described below, the method 500 may be considered to be implemented in the above described system 102.

At block 502, a plurality of parameters may be captured from a user using the capturing module 212. The plurality of parameters may be captured by the plurality of quadrants representing relationship amongst the plurality of dimensions associated with the IT service. Further, the plurality of parameters may be associated with the plurality of dimensions. The plurality of parameters may comprise of an amount invested by the stakeholder (INV), a first set of weights (W) assigned to one or more qualities associated with the one or more functionalities, quality values (QD, QC, QP), a numerical value indicating an existence of a relation of the one or more functionalities with business units (VF), a transaction price (TrXP), a business volume (VOL), and a second set of weights (WS) assigned to the business units. The plurality of parameters may be based on stakeholders' individual perception. The plurality of parameters may be stored in the system database 220.

At block 504, a weightage for each quality based on the first set of weights (W) and one or more functionalities may be determined At block 506, a relative quality index for each quality based on a ratio of quality values and the weightage may be determined At block 508, a value addition factor for each quality based on the relative quality index and a numerical value indicating an existence of a relation of the one or more functionalities (VF) with business units may be determined.

At block 510, a cumulative value addition (CVA) factor for each business unit based on the value addition factor may be determined.

At block 512, a total value addition by each business unit based on the cumulative value addition factor, a transaction price (TrXP), and a business volume (VOL) may be determined At block 514, an amount of returns gained by the stakeholder from each business unit (SV_Share) based on the total value addition and a second set of weights (WS) may be determined.

At block 516, total returns gained by the stakeholder from all the business units (SV_Gain) based on the amount of returns gained by the stakeholder may be determined At block 518, a relative value realization index associated with at least one of the stakeholder level (STAKE_rVRI) and an organization level (ORG_rVRI) may be computed based on the plurality of parameters captured at the block 502 and a plurality of attributes determined at the blocks 504 to 516. The relative value realization index may be dynamically varied based upon variation of one or more parameters. Further, such variation may be traced dynamically in real time using a traceability matrix generated by the traceability module 218.

Although implementations for methods and systems for dynamically tracing a value realized by an Information Technology (IT) service have been described in language specific to structural features and/or methods, it is to be understood that the appended claims are not necessarily limited to the specific features or methods described. Rather, the specific features and methods are disclosed as examples of implementations for dynamically tracing a value realized by an Information Technology (IT) service.

We claim:

1. A method for dynamically tracing a value realized by an Information Technology (IT) service to be deployed in an IT enabled framework, the method comprising:

generating, by a processor, a correlation matrix representing relationship between a plurality of dimensions associated with the IT service, wherein the correlation matrix is generated in form of a plurality of quadrants, wherein each quadrant represents the relationship between at least two dimensions, wherein the correlation matrix is capable of tracing through the plurality of dimensions in clockwise and anticlockwise directions;

capturing a hierarchy of parameters, associated with the plurality of dimensions, wherein at least one parameter, in the hierarchy, is contextually related and dependent upon at least one other parameter, wherein the hierarchy of parameters comprise an amount invested by one or more stakeholders corresponding to one or more functionalities associated with the IT service, a first set of weights assigned to one or more qualities associated with the one or more functionalities, quality values associated with the one or more qualities, a numerical value indicating an existence of a relation of the one or more functionalities with business units, a transaction price and a business volume, and a second set of weights assigned to the business units based upon revenue generated by the business units, wherein the one or more qualities is represented hierarchically such that each quality includes one or more sub-qualities that are measurable, wherein the amount invested by the one or more stakeholders is indicative of improvement required for enhancing quality characteristics of IT products or the IT services and thereby adding a value to the one or more stakeholders and organization at large, wherein the relationship represents whether or not the one or more functionalities result in a value addition to the business units of the organization and the value addition to the organization occurs as a result of difference, causing a positive effect, in a delivered quality and a promised quality, wherein the hierarchy of parameters are stored in a database, wherein each of the one or more functionalities is assigned with a weight for a quality that has an impact;

determining, by the processor, a plurality of attributes, wherein the plurality of attributes comprise weightage for each quality of the one or more qualities, a relative quality index for each quality, a value addition factor for each quality, a cumulative value addition factor for each business unit, a total value addition by each business unit, amount of returns gained by the stakeholder and total returns gained by the stakeholder from the business units;

computing, by the processor, a relative value realization index (rVRI) using the hierarchy of parameters, wherein the relative value realization index is indicative of value realized, by the IT service, with respect to the dimensions, wherein the rVRI is indicative of a return on investment based on a value addition of the IT service and the value addition represents a magnitude of the impact of the one or more functionalities, wherein the impact is quantified on a common scale for the one or more qualities, the one or more functionalities and the value addition;

generating, by the processor, a traceability matrix indicating correlation between the relative value realization index and the hierarchy of parameters; and tracing, using the traceability matrix, variation in the relative value realization index based upon dynamic variation of one or more parameters in the hierarchy, wherein the traceability matrix provide insights on variation of the relative value realization index, and also allow a user to correlate the plurality of parameters with the relative value realization index and trace in real time the impact of variation of the one or more parameters related to the dimensions on the value gained by the user or the organization, wherein the determination of plurality of attributes comprises computing:

the weightage for each quality of the one or more qualities based on the first set of weights and the one or more functionalities;

the relative quality index for each quality based on a ratio of the quality values and the weightage;

the value addition factor, relative to the business units, for each quality based on the relative quality index and the numerical value indicating an existence of a relation of the one or more functionalities with the business units;

the cumulative value addition factor for each business unit of the business units based on the value addition factor;

the total value addition by each business unit based on the cumulative value addition factor, the transaction price, and the business volume;

the amount of returns gained by the stakeholder from each business unit based on the total value addition and the second set of weights; and the total returns gained by the stakeholder from the business units based on the amount of returns gained by the stakeholder, wherein the plurality of dimensions comprises one or more stakeholders, one or more functionalities, one or more qualities and a business value, wherein the plurality of quadrants comprises a first quadrant, a second quadrant, a third quadrant and a fourth quadrant, wherein the plurality of dimensions and the plurality of quadrants in the correlation matrix are displayed through an input/output (I/O) interface and the I/O interface facilities in obtaining the plurality of parameters from the user through a user device, wherein the first quadrant represents relation between the one or more stakeholders and the one or more functionalities, and wherein the second quadrant represents relationship between the one or more functionalities and the one or more qualities, and wherein the third quadrant represents relationship between the one or more qualities and the business value, and wherein fourth quadrant represents relationship between the business value and the one or more stakeholders.

2. The method of claim 1, wherein the one or more qualities comprise at least one of the delivered quality, current quality and the promised quality, wherein the value addition to the organization is a result of delivering quality of the IT service beyond the promised quality.

3. The method of claim 1, wherein the weightage is determined using $$WQ_{1j} = \frac{\sum_{i=1}^{m} w_{ij}}{m*100},$$

wherein WQ represents the weightage for each quality, 'W' represents the first set of weights, 'i' represents the number of functionalities, and 'j' represents the number of qualities.

4. The method of claim 1, wherein the relative quality index for each quality is determined using $$QI_{ij} = \frac{W_{ij}}{\sum_{i=1}^{m} W_{ij}} * WQ_{1j} * \frac{(QD_{ij} - QP_{ij})}{(QP_{ij} - QC_{ij})}, w$$

wherein, QI indicates the relative quality index for each quality, W corresponds to the first set of weights, WQ represents the weightage for each quality, QD stands for the quality value for the delivered quality, QP stands for the quality value for the promised quality, QC stands for the quality value for the current quality, 'i' represents the number of functionalities, and 'j' represents the number of qualities.

5. The method of claim 1, wherein the value addition factor is determined using $$VA_{kj} = \text{Matrix Multiplication}(VF_{ki}, QI_{ij}) * \frac{1}{\sum_{i=1}^{m} VF_{ki}},$$

wherein VA corresponds to the value addition factor, VF represents the numerical value indicating an existence of a relation of the one or more functionalities with business units, QI stands for the relative quality index for each quality, 'i' corresponds to the number of functionalities, 'j' represents the number of qualities, and 'k' corresponds to the number of business units.

6. The method of claim 1, wherein the cumulative value addition factor is determined by using $$CVA_{k1} = \sum_{j=1}^{m} VA_{kj},$$

wherein, CVA indicates the cumulative value addition factor, VA corresponds to the value addition factor, j represents the number of qualities, and k indicates the number of business units.

7. The method of claim 1, wherein the total value addition by each business unit is determined by using $TVA_{k1}=CVA_{k1}*TrXP_{k1}*VOL_{k1}$, wherein TVA indicates the total value addition by each business unit, CVA represents the cumulative value addition factor, TrXP is the Transaction price, VOL is the Business volume, and 'k' represents the number of business units.

8. The method of claim 1, wherein the amount of returns gained by each stakeholder from each business unit is determined by using $$SV\_Share_{kq} = TVA_{k1} * \frac{WS_{kq}}{\sum_{q=1}^{r} WS_{kq}},$$

wherein SV represents the amount of returns gained by the one or more stakeholders, TVA indicates the total value addition by each business unit, WS indicates the second set of weights, 'k' represents the number of business units, and q represents the number of stakeholders.

9. The method of claim 1, wherein the total return gained by the stakeholder from the business units is determined by using, $$SV\_Gain_{1q} = \sum_{k=1}^{t} SV\_Share_{kq},$$

wherein SV_Gain corresponds to the total return gained by the stakeholder, SV_Share indicates the amount of returns gained by the stakeholder, q corresponds to the number of stakeholders, and 'k' indicates the number of business units.

10. The method of claim 9, wherein the relative value realization index (rVRI) is computed at least one of a stakeholder level and an organization level.

11. The method of claim 10, wherein the relative value realization index (rVRI) at the stakeholder level is computed based upon the total returns gained by the one or more stakeholders and the amount invested by the one or more stakeholders.

12. The method of claim 10, wherein the relative value realization index (rVRI) at the organization level is computed based the total value addition and the amount invested by the one or more stakeholders.

13. The method of claim 11, wherein the relative value realization index at the stakeholder level is computed using $$STAKE\_rVRI_{1q} = \frac{SV\_Gain_{1q}}{\sum_{i=1}^{m} INV_{iq}},$$

wherein STAKE_rVRI indicates the relative value realization index (rVRI) at the stakeholder level, SV_Gain corresponds to the total return gained by the stakeholder, INV indicates the first set of data, 'i' indicates the number of functionalities, and 'q' indicates the number of stakeholders.

14. The method of claim 12, wherein the relative value realization index at an organization level is computed using $$ORG\_rVRI = \frac{\sum_{k=1}^{t} TVA_{k1}}{\sum_{i=1,q=1}^{mr} INV_{iq}},$$

wherein ORG_rVRI indicates the relative value realization index (rVRI) at the organization level, TVA corresponds to the total value addition by each business unit, INV stands for the amount invested by the stakeholder, 'i' indicates the number of functionalities, 'q' corresponds to the number of stakeholders, and 'k' represents the number of business units.

15. A system implemented on a server for dynamically tracing a value realized by an Information Technology (IT) service to be deployed in an IT enabled framework, the system comprising:
 a processor; and
  a memory coupled to the processor, wherein the processor is configured to execute programmed instructions stored in the memory, wherein the programmed instructions comprises instructions for:
  generating a correlation matrix representing relationship between a plurality of dimensions associated with the IT service, wherein the correlation matrix is generated in form of a plurality of quadrants, wherein each quadrant represent the relationship between at least two dimensions, wherein the correlation matrix is capable of tracing through the plurality of dimensions in clockwise and anti-clockwise directions;
  capturing a hierarchy of parameters associated with the plurality of dimensions from a user using a user device communicatively coupled to the server through a network, wherein at least one parameter, in the hierarchy, is contextually related and dependent upon at least one other parameter, wherein the hierarchy of parameters comprise an amount invested by one or more stakeholders corresponding to one or more functionalities associated with the IT service, a first set of weights assigned to one or more qualities associated with the one or more functionalities, quality values associated with the one or more qualities, a numerical value indicating an existence of a relation of the one or more functionalities with business units, a transaction price and a business volume and a second set of weights assigned to the business units based upon revenue generated by the business units, wherein the one or more qualities is represented hierarchically such that each quality includes one or more sub-qualities that are measurable, wherein the amount invested by the one or more stakeholders is indicative of improvement required for enhancing quality characteristics of IT products or the IT services and thereby adding a value to the one or more stakeholders and organization at large, wherein the relationship represents whether or not the one or more functionalities result in a value addition to the business units of the organization and the value addition to the organization occurs as a result of difference, causing a positive effect, in a delivered quality and a promised quality, wherein the hierarchy of parameters are stored in a database, wherein each of the one or more functionalities is assigned with a weight for a quality that has an impact;

determining a plurality of attributes, wherein the plurality of attributes comprise weightage for each quality of the one or more qualities, a relative quality index for each quality, a value addition factor for each quality, a cumulative value addition factor for each business unit, a total value addition by each business unit, amount of returns gained by the stakeholder and total returns gained by the stakeholder from the business units;

computing a relative value realization index (rVRI) using the hierarchy of parameters, wherein the relative value realization index is indicative of value realized, by the IT service, with respect to the dimensions, wherein the rVRI is indicative of a return on investment based on a value addition of the IT service and the value addition represents a magnitude of the impact of the one or more functionalities, wherein the impact is quantified on a common scale for the one or more qualities, the one or more functionalities and the value addition;

generating a traceability matrix indicating correlation between the relative value realization index and the hierarchy of parameters; and tracing, using the traceability matrix, variation in the relative value realization index based upon dynamic variation of one or more parameters, wherein the traceability matrix provide insights on variation of the relative value realization index, and also allow the user to correlate the plurality of parameters with the relative value realization index and trace in real time the impact of variation of the one or more parameters related to the dimensions on the value gained by the user or the organization, wherein determining plurality of attributes comprises computing:

the weightage for each quality of the one or more qualities based on the first set of weights and the one or more functionalities;

the relative quality index for each quality based on a ratio of the quality values and the weightage;

the value addition factor, relative to the business units, for each quality based on the relative quality index and the numerical value indicating an existence of a relation of the one or more functionalities with the business units;

the cumulative value addition factor for each business unit of the business units based on the value addition factor;

the total value addition by each business unit based on the cumulative value addition factor, the transaction price, and the business volume;

the amount of returns gained by the stakeholder from each business unit based on the total value addition and the second set of weights; and the total returns gained by the stakeholder from the business units based on the amount of returns gained by the stakeholder, wherein the plurality of dimensions comprises one or more stakeholders, one or more functionalities, one or more qualities and a business value, wherein the plurality of quadrants comprises a first quadrant, a second quadrant, a third quadrant and a fourth quadrant, wherein the plurality of dimensions and the plurality of quadrants in the correlation matrix are displayed through an input/output (I/O) interface and the I/O interface facilities in obtaining the plurality of parameters from the user, wherein the first quadrant represents relation between the one or more stakeholders and the one or more functionalities, and wherein the second quadrant represents relationship between the one or more functionalities and the one or more qualities, and wherein the third quadrant represents relationship between the one or more qualities and the business value, and wherein fourth quadrant represents relationship between the business value and the one or more stakeholders.

16. A non-transitory computer readable medium embodying a program executable in a computing device for dynamically tracing a value realized by an Information Technology (IT) service to be deployed in an IT enabled framework, the program comprising:

a program code for generating a correlation matrix representing relationship between a plurality of dimensions associated with the IT service, wherein the correlation matrix is generated in form of a plurality of quadrants, wherein each quadrant represent the relationship between at least two dimensions, wherein the correlation matrix is capable of tracing through the plurality of dimensions in clockwise and anticlockwise directions;

a program code for capturing a hierarchy of parameters associated with the plurality of dimensions, wherein at least one parameter, in the hierarchy, is contextually related and dependent upon at least one other parameter, wherein the hierarchy of parameters comprise an amount invested by one or more stakeholders corresponding to one or more functionalities associated with the IT service, a first set of weights assigned to one or more qualities associated with the one or more functionalities, quality values associated with the one or more qualities, a numerical value indicating an existence of a relation of the one or more functionalities with business units, a transaction price and a business volume and a second set of weights assigned to the business units based upon revenue generated by the business units, wherein the one or more qualities is represented hierarchically such that each quality includes one or more sub-qualities that are measurable, wherein the amount invested by the one or more stakeholders is indicative of improvement required for enhancing quality characteristics of IT products or the IT services and thereby adding a value to the one or more stakeholders and organization at large, wherein the relationship represents whether or not the one or more functionalities result in a value addition to the business units of the organization and the value addition to the organization occurs as a result of difference, causing a positive effect, in a delivered quality and a promised quality, wherein the hierarchy of parameters are stored in a database, wherein each of the one or more functionalities is assigned with a weight for a quality that has an impact;

a program code for determining a plurality of attributes, wherein the plurality of attributes comprise weightage for each quality of the one or more qualities, a relative quality index for each quality, a value addition factor for each quality, a cumulative value addition factor for each business unit, a total value addition by each business unit, amount of returns gained by the stakeholder and total returns gained by the stakeholder from the business units;

a program code for computing a relative value realization index (rVRI) using the hierarchy of parameters, wherein the relative value realization index is indicative of value realized, by the IT service, with respect to the dimensions, wherein the rVRI is indicative of a return on investment based on a value addition of the IT service and the value addition represents a magnitude of the impact of the one or more functionalities, wherein the impact is quantified on a common scale for the one or more qualities, the one or more functionalities and the value addition;

a program code for generating a traceability matrix indicating correlation between the relative value realization index and the hierarchy of parameters; and a program code for tracing, using the traceability matrix, variation in the relative value realization index based upon dynamic variation of one or more parameters, wherein the traceability matrix provide insights on variation of the relative value realization index, and also allow a user to correlate the plurality of parameters with the relative value realization index and trace in real time the impact of variation of the one or more parameters related to the dimensions on the value gained by the user or the organization, wherein determination of plurality of attributes comprises computing:
- the weightage for each quality of the one or more qualities based on the first set of weights and the one or more functionalities;
- the relative quality index for each quality based on a ratio of the quality values and the weightage;
- the value addition factor, relative to the business units, for each quality based on the relative quality index and the numerical value indicating an existence of a relation of the one or more functionalities with the business units;
- the cumulative value addition factor for each business unit of the business units based on the value addition factor;
- the total value addition by each business unit based on the cumulative value addition factor, the transaction price, and the business volume;
- the amount of returns gained by the stakeholder from each business unit based on the total value addition and the second set of weights; and
- the total returns gained by the stakeholder from the business units based on the amount of returns gained by the stakeholder, wherein the plurality of dimensions comprises one or more stakeholders, one or more functionalities, one or more qualities and a business value, wherein the plurality of quadrants comprises a first quadrant, a second quadrant, a third quadrant and a fourth quadrant, wherein the plurality of dimensions and the plurality of quadrants in the correlation matrix are displayed through an input/output (I/O) interface and the I/O interface facilities in obtaining the plurality of parameters from a user, wherein the first quadrant represents relation between the one or more stakeholders and the one or more functionalities, and wherein the second quadrant represents relationship between the one or more functionalities and the one or more qualities, and wherein the third quadrant represents relationship between the one or more qualities and the business value, and wherein fourth quadrant represents relationship between the business value and the one or more stakeholders.

* * * * *